Inventor:
John R. Rairden, III,
by John J. Kessane
His Attorney.

March 31, 1970 J. R. RAIRDEN III 3,504,325

β-TUNGSTEN RESISTOR FILMS AND METHOD OF FORMING

Filed Oct. 17, 1967 2 Sheets-Sheet 2

Inventor:
John R. Rairden, III,
by John J. Kissane
His Attorney.

United States Patent Office 3,504,325 Patented Mar. 31, 1970

3,504,325

β-TUNGSTEN RESISTOR FILMS AND METHOD OF FORMING

John R. Rairden III, Niskayuna, N.Y., assignor to General Electric Company, a corporation of New York Filed Oct. 17, 1967, Ser. No. 675,990
Int. Cl. H01c 7/00
U.S. Cl. 338—160 15 Claims

ABSTRACT OF THE DISCLOSURE

β-Tungsten resistor films having resistances higher than 5000 ohms/sq. and temperature coefficients of resistance smaller than —200 p.p.m./° C. are formed by evaporating a tungsten source in $5\times10^{-5}$ to $1\times10^{-3}$ torr air and depositing the β-tungsten resistor films upon nonmetallic substrates heated to a temperature in excess of 25° C.

Figure 1:
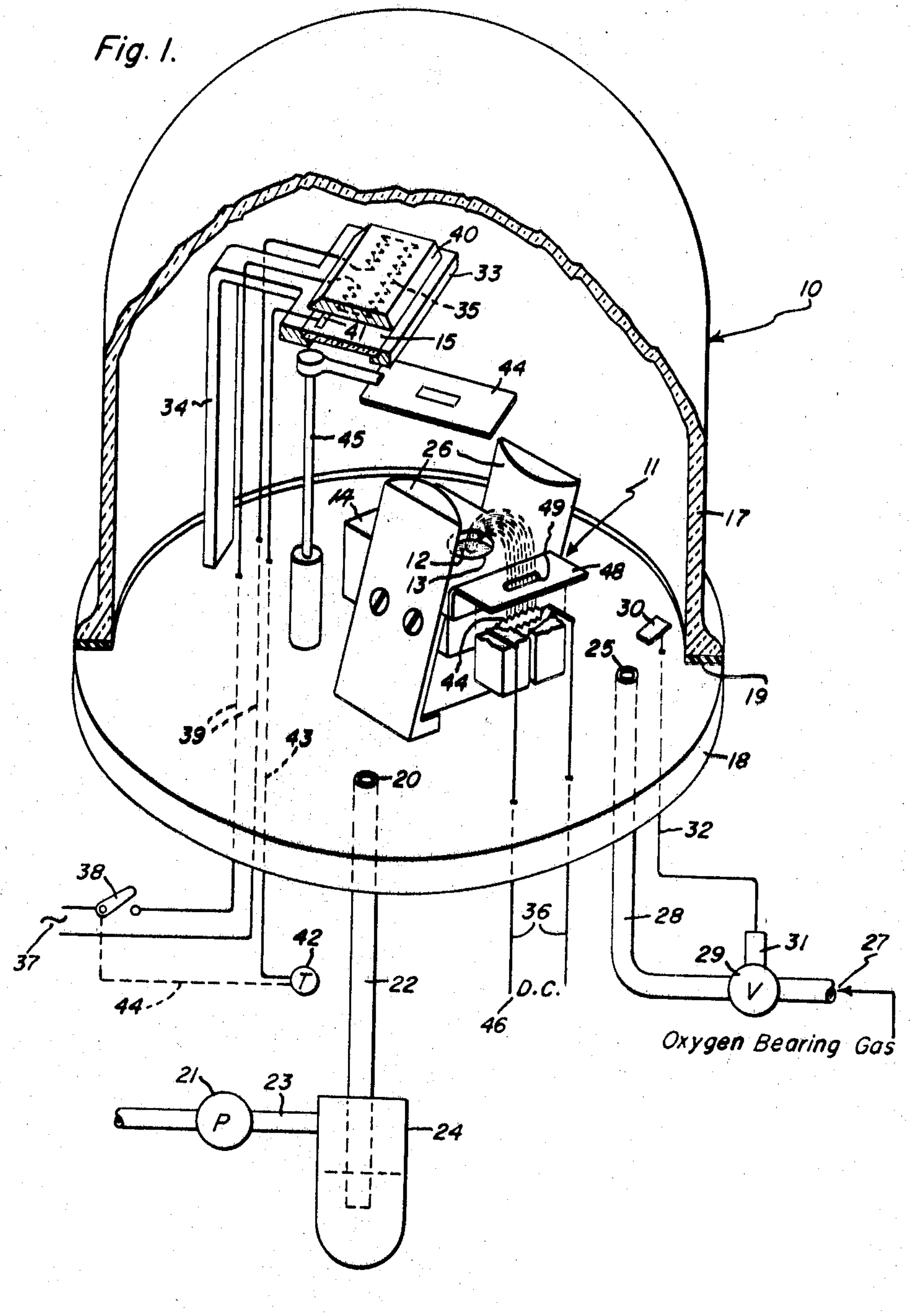

This invention relates to resistor films of β-tungsten and to a method of forming β-tungsten resistor films by reactive evaporation of a tungsten source in an oxygen bearing atmosphere.

β-Tungsten generally has been a source of scientific curiosity and controversy since the initial observation of two "structural" forms of tungsten, e.g. a body-centered cubic structure with α=3.16 A. (designated α-tungsten) and a more complex cubic structure with 21 atoms per cell unit and α=5.04 A. (designated β-tungsten). Thus, β-tungsten also has been described as a sub-oxide modification of the normal body-centered cubic form of tungsten with the probable ideal formula $W_3O$. Prior investigations of various methods of producing β-tungsten, as described in Nature, 175, p. 131, 1955, generally has resulted in the conclusion that β-tungsten can be formed only by chemical processes, e.g. by the hydrogen reduction of various tungsten oxides. β-tungsten also has been observed in specialized environmental conditions, such as on the envelopes of certain types of oxygen-free vacuum lamps, but no known utility for β-tungsten has existed prior to this time.

I have discovered that thin films formed of β-tungsten exhibit an extremely high resistance and a low temperature coefficient of resistance thereby making β-tungsten films desirable as stabilized resistor films. I also have discovered that β-tungsten can be formed by the vacuum deposition of a tungsten source under closely controlled conditions, e.g. by vaporizing at least a portion of body-centered cubic tungsten in an enclosed, oxygen bearing chamber and depositing the vaporized tungsten as β-tungsten upon a heated substrate. β-tungsten resistor films formed by vacuum deposition also have been found to exhibit superior resistance to abrasion and are highly suited for potentiometer resistor films.

It is therefore an object of this invention to provide a novel resistor film having a high resistance and a low temperature coefficient of resistance.

It is another object of this invention to provide a resistor film having superior abrasion resistance.

It is also an object of this invention to provide a potentiometer having superior durability.

It is a still further object of this invention to provide a novel method of simply and economically forming β-tungsten films.

These and other objects of this invention generally are accomplished by β-tungsten resistor films formed by the vacuum deposition of tungsten upon a heated substrate in a low pressure oxygen atmosphere. Thus, β-tungsten resistor films are produced by positioning a nonconductive substrate and a tungsten source within an enclosed chamber and heating the substrate to a temperature in excess of 25° C. The chamber then is evacuated to an oxygen pressure relative to the source to substrate distance to effectuate a collision between a vaporized tungsten molecule and an oxygen molecule prior to deposition of vaporized tungsten upon the substrate. Upon evacuation of the chamber to the proper pressure, a portion of the tungsten source is vaporized and deposited as a β-tungsten resistor film upon the substrate. β-Tungsten films having superior resistor characteristics, e.g. a resistance of approximately 1000 ohms/sq. and a temperature coefficient of resistance below —100 p.p.m./° C., are produced in an air environment when the arithmetic product of the source to substrate distance and the air pressure in the chamber lie within a range from $3.5\times10^{-3}$ to $1\times10^{-2}$ torr cm. and the substrate is heated to a temperature between 125° C. and 320° C.

Figures 2, 3:
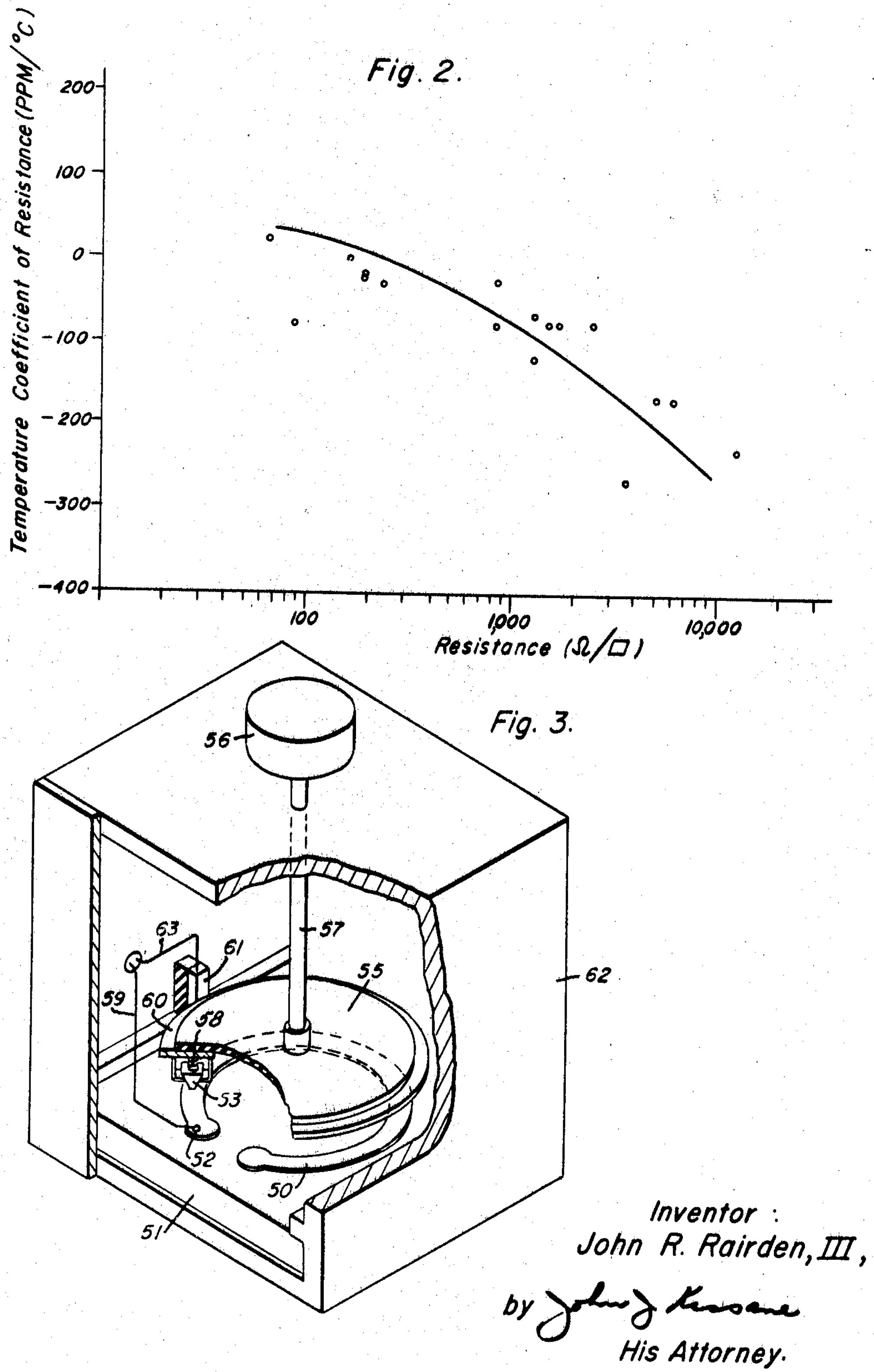

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is an isometric view of an electron beam evaporation chamber suitable for forming the β-tungsten resistor films of this invention, FIG. 2 is a graph depicting the variation of resistance with temperature coefficient of resistance for β-tungsten resistor films formed by the method of this invention, and FIG. 3 is a partially broken away view of a potentiometer employing a β-tungsten resistor film as the traversed resistor element.

An apparatus suitable for forming the β-tungsten resistor films in accordance with this invention is depicted in FIG. 1 and generally includes an evaporation chamber 10 having a transverse electron beam gun 11 positioned therein for the evaporation of a portion of a body-centered cubic tungsten source 12 positioned within cup 13 of water cooled crucible 14. The evaporated tungsten passes through the controlled oxygen bearing environment within the chamber and is deposited as β-tungsten upon substrate 15.

Evaporation chamber 10 generally includes a stainless steel envelope 17 positioned atop a circular base 18 with a suitable sealant, shown as gasket 19, being provided between envelope 17 and base 18 to assure isolation of the evaporation chamber interior. Evacuation of the chamber is accomplished through an aperture 20 approximately centrally positioned within base 18 and communicated to exhaust pump 21 by evacuation lines 22 and 23, with a liquid nitrogen trap 24 being positioned intermediate evacuation lines 22 and 23 to prevent contamination of the chamber during operation of pump 21.

A second aperture 25 wthin base 18 permits the admission of an oxygen bearing gas 27, e.g. oxygen or air, into the chamber through conduit 28 and motor driven variable leak valve 29 to continuously maintain the oxygen pressure within the evaporation chamber at the desired pressure (as will be explained hereinafter) for the formation of β-tungsten resistor film. An ionization gauge 30 positioned within the enclosed chamber and communicated to automatic valve controller 31 through electrical lead 32 functions to control the operation of variable leak valve 29 and regulate the oxygen bearing gas pressure within chamber 10.

Substrate 15, upon which the β-tungsten resistor film is to be deposited, can be any nonconductive material, e.g. soda lime glass, quartz, mica or magnesium oxide, and is seated within a rectangular frame 33 positioned at the upper end of an angularly shaped stantion 34 protruding upwardly from base 18. Frame 33 is so situated within the evaporation chamber that substrate 15 is aligned in a generally confronting attitude with tungsten source 12 to receive a generally perpendicular deposition of the evaporated portion of the tungsten source upon the substrate surface.

Preheating of substrate 15 and control of the substrate temperature during deposition generally is accomplished by a tungsten heater coil 35 positioned in an overlying attitude with the substrate and energized by an alternating current source 37 through suitable disconnect means, shown as switch 38, in electrical leads 39 connecting the current source to the tungsten heater. A heat reflector 40 shrouds tungsten heater coil 35 to concentrate the generated heat from the coil upon the surface of the substrate and a platinum/platinum rhodium thermocouple 41, connected to a temperature gauge 42 through electrical lead 43, is positioned along the edge of the substrate face remote from tungsten source 12 to permit visual monitoring of the substrate temperature. Suitable interlocking means, depicted by dashed lines 44 for simplicity of illustration, are provided between temperature 42 and switch 38 to automatically regulate the temperature of the substrate both before and during deposition of the β-tungsten resistor film. Although heating of substrate 15 is shown as being produced by tungsten heater coil 35, other suitable heating methods, e.g. shielding the substrate during the initial stages of evaporation and employing the generated heat of evaporation to preheat the substrate to the required temperature, also may be used to raise the substrate temperature above 25° C. prior to deposition of the β-tungsten film.

In order to control the deposition area of the resistor film upon the substrate and the resulting film resistance for a given deposition thickness, an apertured shield 44 is positioned upon the outermost extension of an angularly shaped rod 45 and the rod is rotatable by suitable means (not shown) to position the shield in an underlying attitude relative to the substrate. For experimental purposes, a rectangular aperture measuring 1 mm. x 10 mm. (10 sq.) was found to provide a suitably large film to permit measurment of film resistance by conventional methods, such as the 4 probe technique, while providing a convenient conversion factor for the measured resistance.

The transverse electron beam gun 11 utilized for evaporation of tungsten source 12 generally includes a cathode 47 energized by a negative D.C. potential 46 through leads 36 for the emission of electrons and a grounded anode 48 having an oval aperture 49 through which the generated electrons are propelled as a stream. As the electron stream passes beyond anode 48, the magnetic field produced by a pair of generally upstanding, slightly convergent pole pieces 26 deflects the electrons in an arcuate attitude to impinge the electron stream upon tungsten source 12 thereby evaporating a portion of the tungsten source. Energization of cathode 47 with a D.C. potential of −8000 volts and the generation of a 700 milliampere stream from the electrode have been found to provide sufficient evaporation of the tungsten source to deposit 150 A. per minute of β-tungsten upon a substrate positioned approximately 14 inches from the tungsten source.

In the operation of the method of this invention, a suitable nonconductive substrate such as a soda lime glass substrate, after being cleaned, e.g. by boiling in water containing detergent, successively rinsed in cold and hot deionized water and isopropyl alcohol and dried in isopropyl alcohol vapors, is seated within rectangular frame 33 and a tungsten source 12 is positioned within cup 13 of water cooled crucible 14 at a suitable distance, e.g. 14 inches, from the substrate. Stainless steel envelope 17 then is placed upon circular base 18 and exhaust pump 21 is operated to evacuate the chamber to a relative low pressure of approximately $5\times10^{-5}$ torr.

Upon evacuation of the chamber, variable leak valve 29 is operated to purge the system for a suitable period e.g. 10 minutes, with the oxygen bearing gas to be employed during the tungsten evaporation and the pressure in the chamber being regulated to produce an oxygen level between approximately $5\times10^{-5}$ torr to $3\times10^{-4}$ torr. When the oxygen bearing gas employed in the evaporation chamber is air, the initial evacuation and purging of the system generally is not required and the evaporation chamber can be immediately pumped down to a desired evaporation pressure of $5\times10^{-5}$ to $1\times10^{-3}$ torr air. Other oxygen and air pressures also can be utilized for the evaporation, if desired, provided the substrate is positioned from source 12 by a distance approximately equal to or greater than the mean free path of a tungsten molecule. To effectuate this result, the arithmetric product of the oxygen pressure within the chamber and the source to substrate distance should be at least approximately $5\times10^{-3}$ torr cm. in order to produce a collision between a vaporized tungsten molecule and an oxygen molecule within the chamber before deposition of the evaporated tungsten upon the substrate. In actual practice, however, apparatus limitations, e.g. shorting of the electron gun and the permissive size of the evacuation chamber, generally restrict the operable pressure range of the evaporation chamber.

Although β-tungsten resistor films can be formed over a generally wide pressure range, superior resistor characteristics are obtained when the arithmetic product of the source to substrate distance and the air pressure of the evaporation chamber lies within a range between $3.5\times10^{-3}$ to $1\times10^{-2}$ torr cms., e.g. $1\text{–}3\times10^{-4}$ torr air for a 14 inch source to substrate distance. For example, a comparison of β-tungsten resistor films formed upon substrates positioned 14 inches from the tungsten source under identical conditions except for variations in pressure of $8\times10^{-4}$ torr had a resistance of 960 ohms/sq. and a temperature coefficient of resistance equal to −360 p.p.m./° C. while resistor films formed at a pressure of $2\times10^{-4}$ torr air (within the preferred range) exhibited a resistance of 1280 ohms/sq. and a temperature coefficient of resistance of −140 p.p.m./° C.

Prior to and during the deposition of the β-tungsten resistor films the temperature of substrate 15 is maintained between 25° C. and 465° C. by tungsten heat coil 35 which coil is intermittently energized by alternating current means 37 as controlled by thermocouple 41 and switch 38. When the substrate is heated above 465° C., resistor films deposited upon the substrate exhibit a conventional body-centered cubic tungsten structure rather than a β-tungsten structure and the conventional tungsten films exhibit a high positive temperature coefficient of resistance.

Resistor films deposited on substrates having no preheat generally exhibited a high negative temperature coefficient of resistance, e.g. over −300 p.p.m./° C. for a resistor film of 900 ohms/sq., as compared to temperature coefficients of resistance of approximately −80 p.p.m./° C. for 900 ohms/sq. resistor films deposited on substrates preheated to 165° C. Furthermore the temperature coefficients of resistance of the films were found to increase sharply with increased resistance when no preheating of the substrate was employed in the formation of the resistor films.

Minimum temperature coefficients of resistance and a minimum slope in the temperature coefficient of resistance-resistance curve generally were obtained when the β-tungsten resistor depositions were conducted with the substrate heated to a temperature in a range between 125° C. and 320° C. High resistance tungsten resistor films, e.g. resistances greater than 10,000 ohms/sq., were obtained using a substrate temperature of 165° C. produced by a heater coil input power of 3 watts per square inch substrate area.

After the evaporation chamber has been pumped to a desired pressure, the substrate heated and shield 44 rotated into an underlying attitude relative to the substrate, electron beam gun 11 is energized to deposit a β-tungsten resistor film upon the substrate. An electron beam power of 5.6 kilowatts generally is sufficient to produce a deposition rate of 150 A. per minute upon a substrate 14 inches from the source and the deposition period is varied dependent upon the desired thickness for the resistor film. Most of the β-tungsten resistor films preferably are deposited to a thickness of less than 1000 A. to obtain a high resistance value in the film with resistor film thicknesses of 25 A. or less generally producing resistances well above 1000 ohms/sq. However if the β-tungsten resistor films are very thin, e.g. below 10 A., the microroughness of the substrate often tends to adversely affect the continuity (and the associated electrical properties) of the deposited resistor film.

After deposition has been completed, evaporation chamber 10 is evacuated by exhaust pump 21 to reduce the pressure within the chamber to a value of approximately $5\times10^{-5}$ torr air or less and the deposited resistor film is allowed to cool in the relatively high vacuum of the chamber to produce the high resistance, low temperature coefficient of resistance β-tungsten resistors characteristically depicted in the graph of FIG. 2.

To experimentally determine the characteristics of the deposited resistor films, four indium solder dots were positioned along the surface of the films permitting resistance measurements to be taken by the 4-probe technique and the films were thermally cycled between 25° C. and 125° C. until the measured resistance became constant. Although thermal stability was achieved in most films within 2 to 4 thermal cycles, some samples required baking in an oxygen bearing atmosphere, e.g. air, to achieve short term thermal stability. The baked samples generally exhibited an increase in resistance during the first few hours of baking whereupon the measured resistance levelled to a value within ±0.5% of a constant magnitude.

Baking of the β-tungsten resistor films in air however generally tended to produce a high negative temperature coefficient of resistance within the films. For example, one 975 ohms/sq. β-tungsten resistor film baked at 200° C. in air for several hours exhibited a temperature coefficient of resistance of −360 p.p.m./° C. As can be seen from the graph of FIG. 2 depicting the variation of resistance with temperature coefficient of resistance for β-tungsten films formed without a post-heat treatment in air, a β-tungsten film having a resistance of 975 ohms/sq. generally would be expected to have a temperature coefficient of resistance less than −100 p.p.m./° C.

X-ray diffraction analysis of the resistor films deposited by the method of this invention disclose the deposited resistor films to be β-tungsten. Crystalline examination of a β-tungsten resistor film having a resistance of 150 ohms/sq. and a temperature coefficient of resistance of zero p.p.m./° C. disclosed a crystallite size of approximately 135 A. with some preferred orientation of the (100) type. The specific resistivity of the film measured 600 micro ohm centimeters.

A second resistor film (demonstrative of the highest resistance obtained using the method of this invention) exhibited a resistance of approximately 14,000 ohms/sq. and a temperature coefficient of resistance of −240 p.p.m./° C. As can be seen from FIG. 2, β-tungsten resistor films having resistances between 800 ohms/sq. and 1200 ohms/sq. generally were characterized by a temperature coefficient of resistance smaller than −100 p.p.m./° C.

The suitability of the β-tungsten resistor films for potentiometers was demonstrated by depositing a β-tungsten resistor film 50 in a generally circular fashion upon a glass substrate 51, as shown in FIG. 3. The terminals of the deposited resistor film are slightly widened relative to the body of the resistor film to permit a fixed electrical contact 52 to be made to the film while a spring biased carbonaceous contact 53 mounted within a housing 54 secured to the lower face of a circular rotor 55 is provided to circularly traverse the length of the deposited resistor film thereby varying the electrical resistance between fixed contact 52 and traversed contact 53. Rotor 55 is secured to the lower end of a suitably rotatable, e.g. by manual turning of knob 56, rod 57 and carbon contact 53 is biased in a direction toward the deposited resistor film by a coil spring 58 within housing 54 to assure electrical contact between resistor film 50 and carbonaceous contact 53. External electrical connection to the contacts of the potentiometer may be achieved in any manner convenient for the potentiometer structure. For example, in FIG. 3, external connection to fixed contact 52 is depicted as being made by external lead 59 while connection to traversed contact 53 is effectuated by annular conductor 60 mounted upon the lower surface of rotor 55, elongated contact 61 secured to and insulated from casing 62, and external lead 63.

When two β-tungsten resistor films having resistances of 2950 ohms and 2750 ohms, respectively, were deposited on a glass substrate and subjected to 10,000 revolutions of the spring biased carbonaceous contact 53, no variation in the measured resistances of either resistor film was observed. A third similarly deposited β-tungsten resistor film, however, did exhibit an increase in resistance from 3300 ohms after 10,000 revolutions of the spring biased contact 53. Upon close inspection of the β-tungsten resistor film, several deep scratches were observable on the film indicating the resistance variation to be produced by the cutting away of a portion of the β-tungsten resistor film from contact with the main body of the resistor film.

When a commercially used resistor film comprising 80% nickel and 20% chrome was deposited upon a glass substrate and subjected to 10,000 revolutions of the identical spring biased contact employed in testing the β-tungsten resistor films of this invention, a resistance variation in the deposited nickel-chrome resistor film from 1800 to 2400 ohms was measured. No scratches were observed upon the resistor film indicating that the change of resistance in the film was due to a gradual wearing away of the resistor film surface.

What I claim as new and desire to secure by Letters Patent of the United States is:

1. A method of forming a resistor film comprising positioning a nonconductive substrate and a tungsten source within an enclosed chamber, evacuating said chamber to an oxygen pressure relative to the source to substrate distance to effectuate a collision between a vaporized tungsten molecule and an oxygen molecule prior to deposition of vaporized tungsten from said source upon said substrate, preheating said substrate to a temperature in excess of 25° C., vaporizing at least a portion of said tungsten source and depositing a resistor film of β-tungsten upon said preheated substrate.

2. A method of forming a resistor film according to claim 1 wherein the arithmetic product of said oxygen pressure within said chamber and said source to substrate distance is between $5\times10^{-3}$ torr cm. and $10.7\times10^{-3}$ torr cm.

3. A method of forming a resistor film comprising positioning a nonconductive substrate and a tungsten source within an enclosed chamber, evacuating said chamber to produce an air pressure between $5\times10^{-5}$ to $1\times10^{-3}$ torr, heating said substrate to a temperature in excess of 25° C., vaporizing at least a portion of said tungsten source and depositing a resistor film of β-tungsten upon said substrate.

4. A method of forming a resistor film according to claim 3 wherein the arithmetic product of said air pressure within said chamber and said source to substrate distance lies in a range between $3.5\times10^{-3}$ to $1\times10^{-2}$ torr cm.

5. A method of forming a resistor film according to claim 3 further including cooling said deposited resistor film in an environment having a maximum oxygen content equivalent to $5\times10^{-5}$ torr air.

6. A method of forming a resistor film according to claim 3 wherein said substrate is preheated to a temperature less than 470° C.

7. A method of forming a resistor film according to claim 3 including subsequently baking said cooled resistor film in an oxygen bearing atmosphere.

8. A method of forming a resistor film according to claim 4 wherein said tungsten source is vaporized by vacuum evaporation.

9. A method of forming a resistor film according to claim 8 wherein said substrate is heated to a temperature between 125° C. and 320° C.

10. A method of forming a resistor film according to claim 9 wherein said chamber is evacuated to an air pressure of $1\times10^{-4}$ to $3\times10^{-4}$ torr.

11. A method of forming a resistor film comprising positioning a nonconductive substrate and a tungsten source within an enclosed chamber, evacuating said chamber to produce an oxygen pressure-source to substrate distance arithmetic product between $1.8\times10^{-3}$ torr cm. and $10.7\times10^{-3}$ torr cm., heating said substrate to a temperature in excess of 25° C., vaporizing at least a portion of said tungsten source and depositing a resistor film of $\beta$-tungsten upon said substrate.

12. A resistor element comprising a nonconductive substrate, a resistor film of $\beta$-tungsten deposited atop said substrate, and electrical contacts along the surface of said film for applying an electrical potential thereto.

13. A resistor element according to claim 12 wherein said film of $\beta$-tungsten is deposited to a thickness less than 1000 A.

14. A resistor element according to claim 12 wherein said film of $\beta$-tungsten has a grain size less than 500 A.

15. A potentiometer comprising:

(a) a resistor element according to claim 12,
(b) a generally fixed contact on said resistor element,
(c) a movable contact, and
(d) means for traversing said movable contact along the length of said resistor element to vary the electrical resistance between said fixed contact and said movable contact.

References Cited

UNITED STATES PATENTS

| | | | |
|---|---|---|---|
| 2,904,452 | 9/1959 | Reichelt | 117—106 |
| 3,301,707 | 1/1967 | Loeb et al. | 117—227 |

FOREIGN PATENTS

| | | |
|---|---|---|
| 656,875 | 2/1938 | Germany. |
| 971,563 | 2/1959 | Germany. |

WILLIAM L. JARVIS, Primary Examiner

U.S. Cl. X.R.

117—106, 201, 107, 227; 338—162, 308